(12) United States Patent
Hasegawa et al.

(10) Patent No.: US 10,642,784 B2
(45) Date of Patent: May 5, 2020

(54) REDUCING READ OPERATIONS AND BRANCHES IN FILE SYSTEM POLICY CHECKS

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/266,757

(22) Filed: Sep. 15, 2016

(65) Prior Publication Data

US 2018/0075043 A1 Mar. 15, 2018

(51) Int. Cl.
| | |
|---|---|
| *G06F 7/00* | (2006.01) |
| *G06F 16/11* | (2019.01) |
| *G06F 11/14* | (2006.01) |
| *G06F 16/16* | (2019.01) |
| *G06F 21/62* | (2013.01) |
| *G06F 17/00* | (2019.01) |

(52) U.S. Cl.
CPC ........ *G06F 16/122* (2019.01); *G06F 11/1448* (2013.01); *G06F 16/128* (2019.01); *G06F 16/16* (2019.01); *G06F 21/6218* (2013.01)

(58) Field of Classification Search
CPC ......... G06F 17/30082; G06F 17/30115; G06F 17/30088; G06F 16/122; G06F 16/16; G06F 16/128; G06F 11/1448; G06F 21/6218
See application file for complete search history.

(56) References Cited

U.S. PATENT DOCUMENTS

| | | | |
|---|---|---|---|
| 8,762,456 B1 | 6/2014 | Chan et al. | |
| 2008/0126299 A1* | 5/2008 | Schmuck | ............ G06F 12/0862 |
| 2008/0208917 A1 | 8/2008 | Smoot et al. | |
| 2009/0313297 A1* | 12/2009 | Hsu | ................... G06F 17/30017 |

(Continued)

OTHER PUBLICATIONS

List of IBM Patents or Patent Applications Treated as Related, dated Dec. 21, 2017, 2 pages.

(Continued)

*Primary Examiner* — Kannan Shanmugasundaram
(74) *Attorney, Agent, or Firm* — Daniel Yeates

(57) ABSTRACT

A method to identify data elements conforming to a policy includes receiving a request to identify data elements in an input set of data elements that conform to one or more requested policies. According to the method, policy output information describing data elements that conform to a requested policy are saved in association with the requested policy. In response to receiving a subsequent request to identify data elements in a subsequent set of data elements that conform to the requested policy, the method includes outputting the saved policy output information based on the policy output information having been saved in association with the requested policy. A computer program product and a system, configured with processors and a memory that can store saved policy information, can implement the method.

14 Claims, 8 Drawing Sheets

(56) References Cited

U.S. PATENT DOCUMENTS

2012/0259815 A1* 10/2012 Olson ................ G06F 11/1458
707/649
2015/0066857 A1* 3/2015 Dayal .................. G06F 16/128
707/639

OTHER PUBLICATIONS

Hasegawa et al., "Reducing Read Operations and Branches in File System Policy Checks," U.S. Appl. No. 15/851,937, filed Dec. 22, 2017.
Accelerated Examination Support Document, dated Dec. 14, 2017, 16 pages.
Coyne, et al., "IBM Linear Tape File System Enterprise Edition V1.1.1.2 Installation and Configuration Guide", IBM Redbooks, Jan. 2015. 322 pages.
Miyamura et al., "Improvement of Disaster Recovery Time", IBM, Jul. 25, 2014. 6 pages.
Unknown, "Scale Out Backup and Restore (SOBAR)", IBM Knowledge Center, Version 4.2.0. https://www.ibm.com/support/knowledgecenter/STXKQY_4.2.0/com.ibm.spectrum.scale.v4r2.adm.doc/bl1adm_sobar.htm Last accessed Jul. 5, 2016. 1 page.
Unknown, "Basic Techniques of VFS and File System", Atmarkit, May 20, 2003. http://www.atmarkit.co.jp/ait/articles/0305/20/news002_2.html 10 pages.

\* cited by examiner

REDUCING READ OPERATIONS AND BRANCHES IN FILE SYSTEM POLICY CHECKS

BACKGROUND

The present disclosure relates to identifying, by a computing system, particular data elements from among a set of data elements. More specifically, the present disclosure relates to identifying data elements that conform to particular policy attributes.

SUMMARY

According to embodiments of the present disclosure, a method can identify data elements that conform to one or more policies. In embodiments of the present disclosure, one or more processors can perform the method to identify data elements that conform to a policy included in the one or more policies.

According to the method, one or more the processors receive a request to determine data elements, included in an input set of data elements, that conform to a requested policy included in one or more policies input policies. The processors identify a subset of data elements that conform to the requested policy. The processors save policy output information describing the data elements that conform to the requested policy, in association with the requested policy. The processors receive a subsequent request to apply the requested policy to a subsequent set of data elements. In response to the subsequent request, and based on the policy output information previously saved in association with the requested policy, the processors output the saved policy output information.

In some embodiments, a first saved policy is included in saved policy set associated with the first input set of data elements. In response to the first request and based on the association of the first input set of data elements with the saved policy set, the processors identify a second subset of data elements that conform to the first saved policy, from among data elements included in the first input set of data elements.

Also in embodiments of the method, based on first policy output information saved in association with the requested policy, and in response to the subsequent request, the processor(s) determine a difference set. The difference set includes data elements included in the subsequent input set of data elements that are not included in the initial input set of data elements. The processors identify a second subset of data elements, from among data elements included in the difference set of data elements, that conform to the requested policy. The processors generate second policy output information describing the data elements included in the second subset of data elements. The processors output the second policy output information merged with the previously saved first policy output information.

A computer program product and a system can embody aspects and methods of the disclosure. The system includes at least one processor and a memory, in communication with the processors, that is configured to store policy output information. In some embodiments, the memory is further configured to store a saved policy set.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
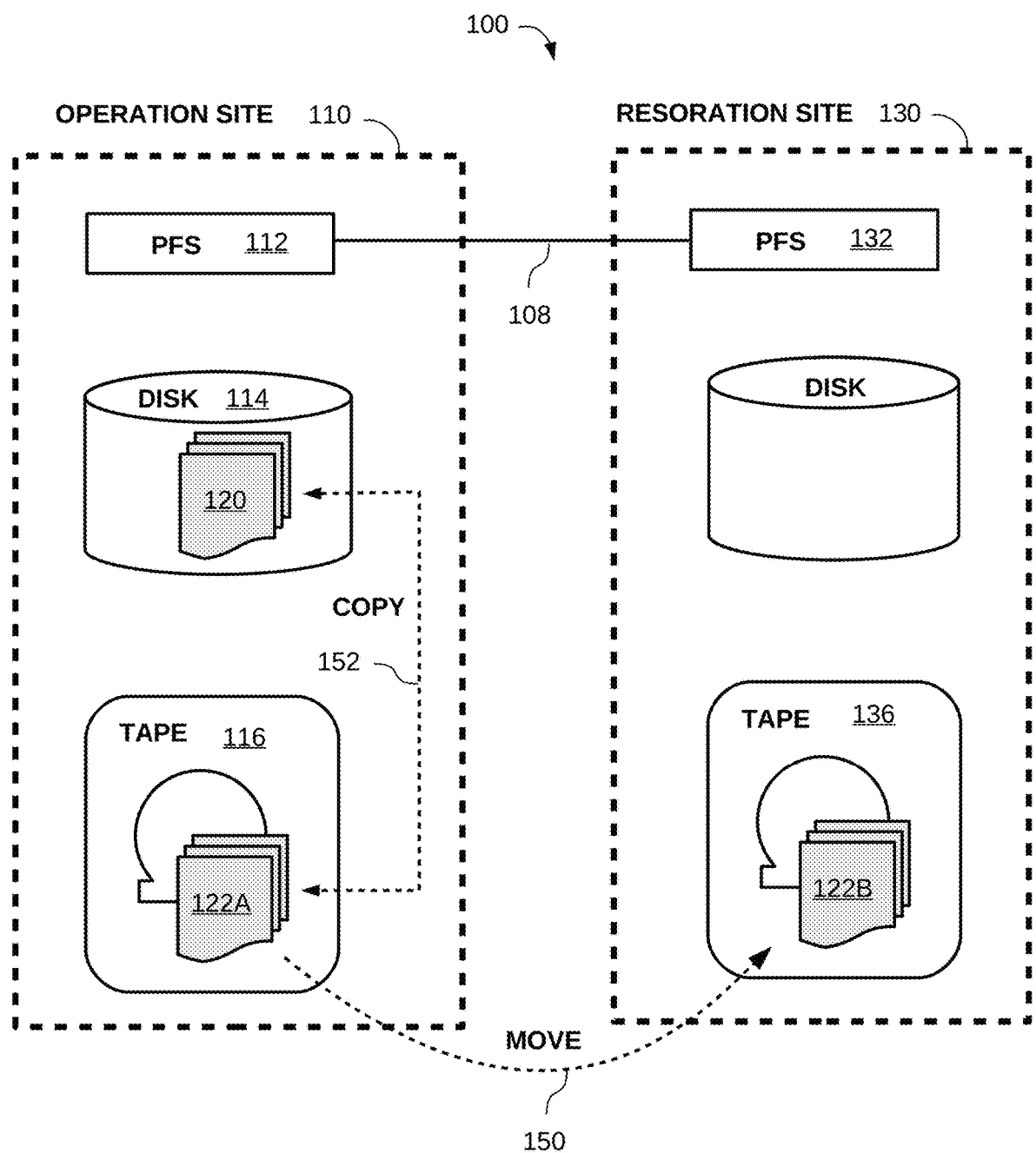
FIG. 1 is a block diagram illustrating an example distributed file system, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "disclosure") relate to identifying, by a computing system, particular data elements from within a set of data elements. More particular aspects relate to identifying particular data elements that conform to a policy.

As used herein, "data element" refers to any type of data that can be evaluated, in a computing system, against a policy to determine conformance with that policy. A computing system can identify any of a variety of types of data elements that conform to any of a variety of policies that specify attributes of the elements, and criteria applied to those attributes (e.g., one or more rules that specify particular values, or value ranges, of one or more attributes), that determine that a data element conforms to the policy.

For example, records in a database, or in a catalog, can be data elements that can be evaluated based on, for example, particular attributes of a record (e.g., a product type and/or serial number, or a record modification time) that conform to particular attribute values, or value ranges, of a policy. In another example, a file component of a file system can be a data element that can be evaluated based on, for example, particular attributes of a file component (e.g., a file or directory type, or a file or directory modification date) that conform to particular attribute values, or value ranges, of a policy. As used herein, a "file component" refers interchangeably to any of a file, a set of files, and/or a file directory or set of file directories, included in a file system.

Identifying file components, in a file system, that conform to a policy can illustrate the disclosure. While the disclosure is not necessarily limited to such applications, various aspects of the disclosure may be appreciated through a discussion of various examples using this context.

A computer file system comprises methods (or, programs) and data structures that a computer (e.g., a program or an operating system executing on the computer) can use to organize and track files stored in various storage media or devices of a computing system. For example, a parallel file system or, alternatively, a network file system, can organize files on shared storage devices (e.g., disk or flash media drives) for access by a cluster of computers. A tape file system can organize files for access by one or more computers according to a serial, or linear, organization of files on a tape media.

Computer file systems can employ one or more policies for managing files stored in the file system. A policy can be a set of rules for managing a file component according to a set of attributes off the file component. Example file component attributes include the name of a user that created, owns, or modified a file component; a name of a group of users to which the owner may belong; the name of a file component, or a file component type (e.g., a file extension); desired or limits to latency to access a file component; and, a creation and/or modification date of the file component. In another example, a file component attribute can define access rights to the file component, such as the names of users or groups can access a file component, and what access permissions are associated with each user or group to access the file component, such as read, write, modify, etc.

As an example, a rule within a policy can specify that file components having particular attributes should be placed in particular locations, or on particular storage devices, within the file system. Rules can relate to managing a file component. For example, a rule can specify conditions under which a file component should be moved within the file system (e.g., from one storage device to another). A rule can specify conditions under which a file component can be replicated, or deleted. For example, a rule can specify that a file component can be replicated or, alternatively, that it cannot be replicated, or if it can be replicated, which users or groups have permission to replicate the file component. In another example, a rule can specify that a file component, or file components having a certain attribute (e.g., a file type or extension, or file creation date) be deleted at a certain time, such as after an "expiration date" specified in the rule.

A function of a file system can include copying file components within the file system to make a "backup" copy of some or all of the file components in the file system. As used herein, "backup copy" refers to a copy of any portion, or all, interchangeably, of the file components comprising a file system. A backup copy can be stored, for example, in a different file system stored on devices also storing the original file system. A backup copy can be stored in a file system using a different set of devices. For example, a file system can normally store file components on a set of disk devices, and can store the backup copy on a tape drive (e.g., a tape drive in a tape pool having multiple tape drives). A backup copy can be considered a "snapshot" of a file system, or a portion thereof (e.g., file components in the file system selected according to a particular criteria), where the snapshot captures a copy of the selected file components at a particular point in time, while the original file components continue to be available for modification after the snapshot copy is made.

FIG. 1 illustrates an example system which includes backup devices, and backup copies of file components in a file system. System 100 includes a parallel file system (as an example of a file system) in each of two installation sites: operation site 110 and restoration site 130. Each of sites 110 and 130 include a parallel file system, PFS 112 in the operation site and PFS 132 in the restoration site.

Operation site 110 includes disk 114 (representing one or a plurality of disk drives), which stores file components included in PFS 112, such as file component set 120. Operation site 110 further includes tape 116 (representing one or a plurality of tape drives), which can be used to store backup copies of file components in PFS 112. For example, file components included in file component set 120 can be copied to backup copy 122A and backup copy 122A can be, as shown, stored on tape 116.

Restoration site 130 can include a disk and/or a tape drive to store file components in PFS 132. PFS 132 can receive (over connection 108 to PFS 112) and store backup copies of file components included in PFS 112. For example, restoration site 130 includes tape 136 (representing one or a plurality of tape drives) which is shown storing backup copy 122B. In embodiments of the present disclosure (hereinafter, "embodiments"), a file component can be copied to a backup file component while the file component remains available in the file system. For example, a file component included in file component set 120 can be also included in backup copy 122A and remain available for a program to access, from either the copy in file component set 120 stored on disk 114 or the copy in backup copy 122A stored on tape 116. In another example backup copy 122B can be a duplicate of backup copy 122A, and tape 136 can store backup copy 122B while disk 114 or tape 116 in operation site 110 continues to store backup copy 122A.

Alternatively, in embodiments, a file component can be "moved" to a backup copy; that is, the file component can be copied to a backup copy and the file component removed, or deleted, as a file component available in the file system, or from a particular storage device in the file system. For example, PFS 112 can create and store on tape 116 backup copy 122A of file components in file component set 120, and can then delete one or more of the file components in file component set 120 from disk 114. In another example, backup copy 122A can be moved (150) to restoration site 130. PFS 112 can transfer backup copy 122A to PFS 132, and PFS 132 can store backup copy 122A as backup copy 122B on tape 136. PFS 112 can then delete file component set 120 from disk 114 and can further remove backup copy 122A from tape 116.

Criteria to include, or to exclude, a file component in a backup copy can include that the file component conforms to one or more policies (e.g., conforms to a rule, or a combination of rules, in a policy). For example, a policy can include a policy rule to specify that all file components having a date last modified before a particular date are to be deleted from the file system or from a backup copy of the file system. The particular date comprises an attribute of the rule. In another example, a policy can specify that all file components having a particular file component type, or extension, such as a comma-separated-value (.csv) file type, are to be included in a set of file components for processing, such as to be included in creating a backup copy of selected file components (the file components having a. csv type) in the file system.

Figure 2:
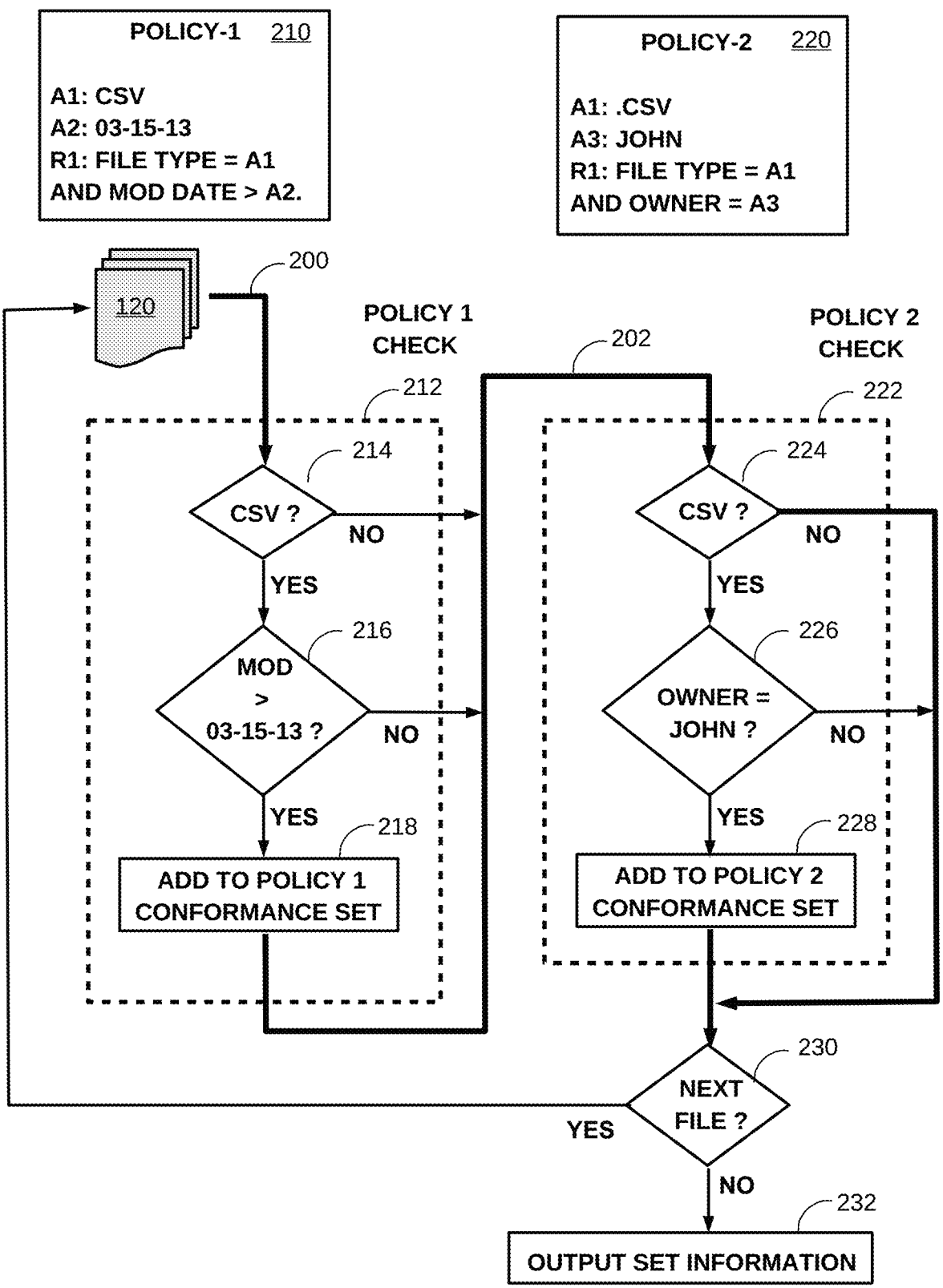
FIG. 2 is a diagram illustrating an example method of forming a set of conforming data elements, according to aspects of the disclosure.

FIG. 2 illustrates an example of applying a set of policies to a set of file components to determine a subset of the file components conforming to each policy. FIG. 2 illustrates two example policies, policy-1 210 and policy-2 220, that can be applied to a set of file components to select file components for a particular kind of processing, based on those file components conforming to one or both of the policies. For example, in the context of the example of FIG. 1, policies 210 and 220 can be used to select file components to include in a backup copy of file component set 120 in PFS 112 of FIG. 1. In one example of applying the policies, file components that conform to either policy 1 or policy 2 can be file components to include in (or, alternatively, exclude from) a backup copy of file components included in file component set 120. In another application, file components conforming to policy 1 can be file components to include in a backup copy and file components conforming to policy 2 can be file components to exclude from the backup copy, even though they may also conform to policy 1.

A program included in, or interacting with, a file system—for example, a program preparing to make up a backup copy of file components—can initiate checking (e.g., by request to a program or function of the file system) the file system (or, a portion thereof) to determine file components conforming with one or more policies. "Policy checker", as used herein, refers to a component, or function, of a computing system that performs, or participates, in applying a policy to one or more files to determine compliance of the file (or, alternatively, data describing the file, such as meta-data) with the policy. A policy checker can be embodied, for example, as a program, a hardware device, or a combination of both, in a computer. Also, in embodiments, a policy checker can comprise a plurality of policy checkers, each applying one or more particular policies, but not necessarily all policies, to the input files (or, more broadly, data elements).

As used herein, a "request" refers to any of a variety of means to request, or invoke, a policy checker to apply one or more policies to an input set of file components. For example, such request means can include a programming command or function call among a set of file system commands or function calls. A request means can be a message from, for example, a program to a computing system or to a policy checker. It will be apparent to one of ordinary skill in the art that there are a variety of means, in a computing system, to request, or invoke, a policy checker, and for the request to include more than a single policy, and/or one or more sets of input data elements to evaluate against the policies, to determine a conforming set of data elements for each policy.

To illustrate the example of FIG. 2, in preparing to make a backup of file components in file component set 120, a program (referred to hereinafter in describing FIG. 2 as "the program") can request a policy checker to check file components in file component set 120 for conformance with one or both of policies 210 and 220. Policy-1 210 rule R1 specifies that a file component conforms with policy 210 if the file component type is attribute A1 (e.g. a CSV file type) and has a modification date greater then attribute A2 (e.g. Mar. 15, 2013). Policy-2 220 rule R1 specifies that a file component conforms with policy 220 if the file component type is attribute A1 (e.g. a CSV file type) and has an owner matching attribute A3 (e.g. JOHN).

As illustrated in FIG. 2, at 200 the policy checker selects a file component from among the file components in file component set 120 to apply policy 1 check 212 to the file component. In performing the policy 1 check, the policy checker tests 214 to determine if a file component is a CSV file type. If not, the policy checker applies 202 policy 2 check 222 to the file component. If the file component is a CSV type file component, at 216 the policy checker determines if the file component has a modification date after Mar. 15, 2013. If so, at 218 the policy checker check adds the file component to a set of file components (not shown) conforming to policy-1 210. If not, or after adding at 218 the file to the set of files conforming to policy-1 210, at 202 the policy checker applies policy 2 check 222 to the file component.

In applying policy 2 check 222, the policy checker determines 224 if the file component is a CSV file type. A policy checker need not necessarily recognize, in applying policy 2 check 222, that policy 1 check 212 included a test for a file component having a file type of CSV. Consequently, in applying policy 2 check 222 to the file component previously checked in policy 1 at 214, a policy checker may perform the test for a file type of CSV at 224 redundantly for that same file component.

If the file component is a CSV type file, at 226 the policy checker determines if the file component has an owner equal to "JOHN". If so, at 228 the policy checker adds the file component to a set of file components conforming to policy-2 220 and, at 230, the policy checker determines if there is another file component included in file component set 120 to check. If at 224 the policy checker determines that the file component is not a CSV type file, or at 228 the policy checker determines that the file component does not have an owner equal to "JOHN", at 230 the policy checker determines if there is yet another file component included in file component set 120 to check.

If, at 230, the policy checker determines that there is another file component to process in file component set 120, at 200 the policy checker selects a new file component from those remaining, and repeats policy checks 212 and 222 to check the newly selected file component for conformance to policies 210 and/or 220. Alternatively, if the policy checker determines at 230 that all file components included in file component set 120 have been checked, then at 232 the policy checker outputs information describing the file components conforming, respectively, to each of policies 210 and 220. The policy output information can be used by the program, for example, to determine file components to include in or, alternatively, exclude from, a backup copy of file components in file component set 120. In embodiments, policy output information can be a set comprising the conforming file components themselves, i-nodes associated with the conforming file components, and/or another description of the conforming file components, such as a list of conforming file components.

It is to be understood that policies 210 and 220 as well as the example values described with respect to FIG. 2 are provided by way of example only and that the specific policies, attributes, and values will vary based on the specific implementation. It will be further understood that, in specific implementations, a policy checker can be embodied in a plurality of policy checking functions or components, such as one policy checking function or component that applies one policy (e.g., policy-1 210), or a portion thereof (e.g., 214) while one or more other policy checking functions or components applies another policy (e.g., policy-2 220), or a portion thereof (e.g., 224).

Data elements can be associated with "information nodes", or "i-nodes". In embodiments, an i-node can be information describing a particular data element. For example, an i-node can comprise information—such as metadata—describing a file component, or set of file components, in a file system. In another example, an i-node can comprise an element (e.g., a record) included in a database, or information describing an element, or set of elements, in a database (or, in a catalog, for example).

Checking the file components, as illustrated in FIG. 2, can be performed by checking i-nodes associated with each of file components (or, associated with one or more directories of the file component in the file system), as opposed to checking the file components themselves. I-nodes can, but need not necessarily, include attributes of the file component, such as previously described (an owner, a last modification date, etc.). I-nodes associated with the file components can be stored separately from the file components themselves. For example, using the example system 100 of FIG. 1, PFS 112 can store i-nodes for file components in file component set 120 on disk 114, tape 116, or on another disk or storage medium (neither shown) within operation site 110 or, for example, in restoration site 130, or a computing system or network in communication with PFS 112.

More than one program can initiate checking file components for conformance with one or more policies, and each of the programs can initiate checking for differing reasons. For example, one program can initiate the checking to prepare making a backup of file components conforming to one set of policies while another program can initiate the checking to prepare making a different backup of file components conforming to that same set of policies (e.g., to make a duplicate backup to store in a different location than the first program). Alternatively, one program can initiate the checking to prepare making a backup of file components conforming to one set of policies while another program can initiate the checking to prepare making a different backup of file components conforming to a different set of policies, which can include some of the first set of policies with additional, other policies, or can include none of the first policies.

Computing systems—particularly distributed computing systems—can be very large. Such systems can include many programs checking file components—possibly repeatedly—for conformance to various policies. Such systems can also include an extremely large number of file components numbering, for example, in the billions, or even trillions, of file components. Correspondingly, checking each of such a large number of file components or, alternatively, i-nodes associated with each of the file components, can demand a lot of computing system processing and/or data transfer bandwidth. Checking each of such a large number of file components, or i-nodes, can additionally take a long time, which can in turn limit performance of the programs dependent on the results of the checks. Accordingly, reducing the number of times the file components are checked can improve the performance of the programs and/or a computing system as a whole.

Figure 3:
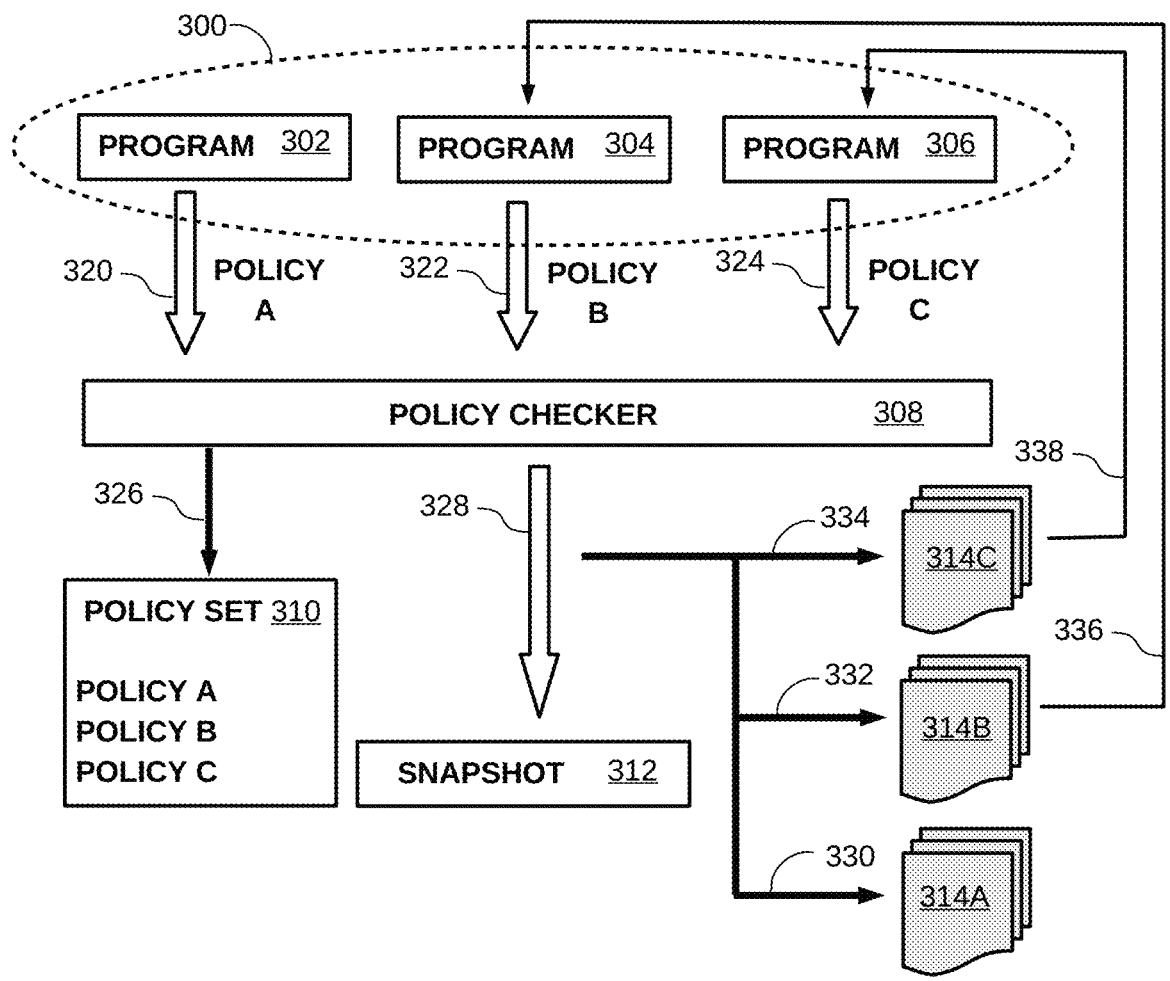
FIG. 3 is a diagram that illustrates an example of applying saved policies to an input set of data elements, according to aspects of the disclosure.

FIG. 3 illustrates an example flow to determine file components conforming to one or more policies and to generate and save (e.g., store in a memory or storage device) the results of previous policy checks applied to a particular set of data elements (e.g., a particular file system or subset thereof). For purposes of illustrating the example, but not intended to limit embodiments, FIG. 3 can be understood in the example context of one or more programs applying policies to determine file components to include in a backup copy of file components in a file system. However, it would be apparent to one of ordinary skill in the art that embodiments can include one or a variety of programs applying policies repetitively to any particular collection of data elements as a method to determine a set of data elements, and the purpose for selecting the data elements can be any of a variety of purposes other than selecting file components to include in a backup copy of the file components. Selecting particular data elements (e.g., file components or database records) associated with a set of data elements, by applying a policy such as described in the disclosure, can be, for example, to access those data elements for purposes other than making a backup copy of the elements.

In FIG. 3, programs 302, 304, and 306 (collectively, "programs 300") can represent programs that request a policy checking function or component of a computing system (to check a set of data elements (e.g., file components, particular elements or records in a database, etc.) for conformance to one or more policies. For example, programs 300 may make or access, for example, a backup copy of file components, such as file components 120 in file system 112 of FIG. 1. The programs may select particular file components from, or to include in, the backup copy based on one or more policies, such as policies (210 and 220) illustrated in the example method of FIG. 2.

In embodiments, programs (e.g., programs 300) can request a policy checker to check a set of elements for conformance to one or more policies. As used herein, "policy checker" refers to any function, or component, of a computing system that can apply one or more policies to a set of data elements to determine conformance of individual data elements with the policies. For example, a policy checker can be a function, or a program, included in a file system that can determine a subset of file components included in the file system that conform to particular policies. In another example, a policy checker can be a function, or a program, included in a database system that can apply policies to records included in the database system to determine a subset of the records that conform to each of the policies. In embodiments, a policy checker can be a program (e.g., a program of a file system or database) or a hardware element, or combination of both, operating in or in communication with the computing system.

To illustrate the example of FIG. 3, but not intended to limit embodiments, policy checker 308 can represent a function of a file system that can evaluate a set of file components, to determine if the file components conform to one or more policies. Programs 300 can request policy checker 308 by means of a function call or file system command that initiates the policy checking functions of policy checker 308. A function call or command can provide one, or a plurality of policies, to the policy checker for evaluation, as well as one, or a plurality of input sets of file components (e.g., one or more snapshots of a file system), for the policy checker to evaluate.

In FIG. 3, snapshot 312 can be a description of a file system (or, alternatively, a subset of components of a file system) taken at a particular time. Each of programs 300 can request policy checker 308 to determine a set of file components in snapshot 312 that conform to one or more policies. As illustrated, program 302 requests 320 policy checker 308 to determine a set of file components conforming to policy A. Policy checker 308 can evaluate the file components for conformance to the policies using, for example, a method such as described with reference to FIG. 2. Similarly, program 304 requests 322 policy checker 308 to determine a set of file components conforming to policy B, and program 306 requests 324 policy checker 308 to determine a set of file components conforming to policy C.

The policy checker can output the results of the policy check as policy output information identifying file components of snapshot 312 conforming to each respective policy. For example, policy checker 308 can output 330 the results of applying policy A as policy output information 314A, and can output, 332 and 334 respectively, the results of checking policy B and policy C, as policy output information 314B and 314C, respectively. As used herein, "policy output information 314" refers, collectively to policy output information 314A, 314B, and 314C. Policy checker 308 can return the output results (e.g., one or more of policy output information 314) to the invoking programs.

Policy checker 308 can associate each of the policy output information 314 with the corresponding policy (A, B, or C) applied to the snapshot. In embodiments, policy output information (e.g., one or more of policy output information 314) can be, for example, a list of the file components, can be the file components themselves (or, a copy thereof), or can be a set of metadata or other descriptive information (e.g., i-nodes) associated with each of the file components that conforms to the policy.

In embodiments, a program can request a policy checker to determine a set of conforming file components for each of a plurality of policies included in the invocation. For example, program 302 can request policy checker 308 to evaluate snapshot 312 according to both policies A and B. Policy checker 308 can receive both policies as inputs and can output 330 information (e.g., 314A) describing file components conforming to policy A, and can output 332 information (e.g., 314B) describing file components conforming to policy B. Policy checker 308 can return (not shown) the policy output information (e.g., policy output information 314A and 314B) regarding each of policies A and B to program 302.

Each time a program requests a policy checker function, the function can repeat evaluating the set of data elements (e.g., snapshot 312 containing a set of file components in a file system) and can generate a unique, new set of conforming data elements. However, as previously described, in computing systems in which a set of data elements to evaluate is very large (e.g., billions of file components, or other elements), each invocation of the policy checker can consume substantial computing and/or data bandwidth, and/or can take substantial time to complete. These disadvantages can be magnified in a system in which programs repeatedly request a policy checker, or many programs request the policy checker, to evaluate the same input set of file components (e.g., snapshot 312, or a particular set of other types of data elements) according to one or more of the same policies.

Accordingly, in embodiments, a policy checker can avoid these disadvantages by saving (e.g., storing in a memory or storage device) particular policies previously applied to a particular set of data elements (e.g., snapshot 312), and/or saving the previous results of evaluating the particular set of data elements with respect to each of the particular policies. In FIG. 3, as a result of programs 300 invoking policy checker 308 to evaluate snapshot 312 for file components conforming to each of policies A, B, and C, policy checker can create a saved policy set—or, alternatively, add to an already saved policy set, such as policy set 310—that includes policies that have been previously applied to snapshot 312, and can associate that saved policy set, and/or particular policies included in that set, with snapshot 312. Policy checker 308 can further save the policy output information 314 and can associate the saved policy output information with policy set 310, particular policies included in that policy set, and/or snapshot 312. The policy checker can return saved policy output information in response to subsequent requests to evaluate the set of data elements, or a subsequent version of the set of data elements (e.g., a second snapshot of a file system taken at a later time than a first snapshot previously checked), for conformance with the (same) policies recorded in policy set 310.

To illustrate, an initial request to policy checker 308 by any one of programs 300 to evaluate snapshot 312 for file components conforming to one or more of policies A, B, and C, a program—for example, program 304—can result in policy checker 308 creating saved policy set 310, or adding the requested policy, or policies to an existing version of policy set 310. Policy checker 308 can associate each of these policies with snapshot 312. Policy checker can save the policy output information resulting from applying each policy (e.g., the corresponding results included in policy output information 314), and can associate each resulting policy output information with the input file component set and/or a policy to which it conforms (e.g., 314A in association with policy A in policy set 310 and/or in association with snapshot 312).

One or more of programs 300 can subsequently request (e.g., 322) policy checker 308 to evaluate snapshot 312 for file components conforming to, for example, policy B. Policy checker 308, having saved policy B in saved policy set 310, and having saved the policy output information 314B in association with that prior policy check for snapshot 312, can return (e.g., 336) policy output information 314B to the requesting program(s) among programs 300. Similarly, for any invocation of policy checker 308 by any of programs 300 to apply a policy (e.g., one or more of policies A, B, and C) to snapshot 312, policy checker 308 can determine, based on that policy recorded (or otherwise included) in policy set 310 associated with snapshot 312, that the same policy had been applied to snapshot 312 and further, having recorded the resulting set of file components conforming to that policy in snapshot 312, can return the prior output results (e.g., one or more of 314A, 314B, and 314C) to the invoking program.

In some embodiments a policy checker can apply all, or a subset, of the policies included in a saved policy set, in response to a request that specifies a particular policy, or policies, whether or not those particular policies are already included in the saved policy set. For example, in the case that policies B and C are included in a saved policy set, such as 310, a request, such as 320, to apply policy A to a file system snapshot can cause policy checker 308 to apply all of policies A, B, and C to the snapshot, and can cause policy checker 308 to save policy output information 314 to record the results of applying the policies to the snapshot, in association with that snapshot and/or the particular policies to which the policy output information corresponds.

Figure 4:
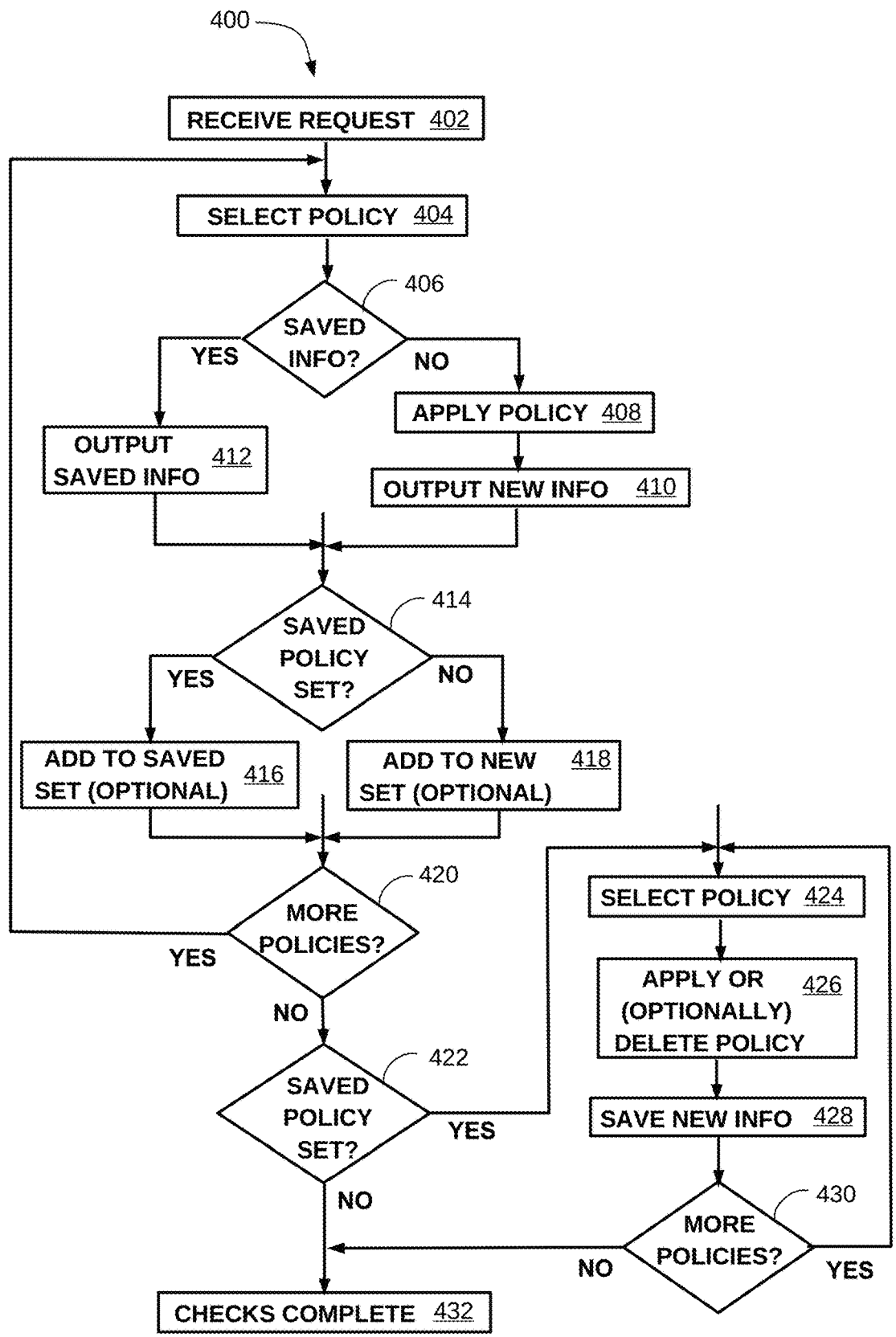
FIG. 4 is a flowchart illustrating an example method to identify a set of conforming data elements, according to aspects of the disclosure.

FIG. 4 is a flowchart illustrating an example method, 400, to generate and utilize results of previous policy checks applied to a particular input set of data elements (e.g., a snapshot of a file system). To illustrate the method, but not intended to limit embodiments, the method is described in the context of one or more programs (referred to, for purposes of describing method 400, as "the requester"), such as programs 300 of FIG. 3, requesting a policy checker, such as policy checker 308, to apply one or more policies to an input set of data elements, and in which the input set of set of data elements is a snapshot of a set of file components included in a file system.

At 402, the policy checker receives a request to check the snapshot for conformance to one or more requested policies. At 404, the policy checker selects a policy, from among the requested policies, to apply to the snapshot. At 406, the policy checker determines if there is policy output information saved from a previous application of the selected policy to the snapshot. If so, at 412, the policy checker outputs the saved policy output information. If not, at 408 the policy checker applies the selected policy to the snapshot. At 408, the policy checker can apply, for example, a method such as illustrated in FIG. 2, to apply the selected policy to the snapshot and determine components of the snapshot that conform to the policy.

At 410, the policy checker outputs new policy output information resulting from applying the selected policy to the snapshot. The new policy output information can be, for example, a set of files included in the snapshot that conform to the selected policy or, alternatively, can be information, such as metadata, describing files included in the snapshot that conform to the selected policy. At 410 the policy checker can, optionally, save (e.g., store in a memory or storage device) the new policy output information and, can save the new policy output information as associated with the snapshot, and/or with the policy selected at 404.

At 414, the policy checker determines if there is a saved policy set associated with the snapshot (or, alternatively, the file system). If so, at 416, the policy checker determines if the selected request policy is included in the saved policy set and, if not, optionally adds the selected policy to the saved policy set. If at 414, the policy checker determines there is not a saved policy set associated with the snapshot (or, the file system), the policy checker, at 418, optionally creates a new saved policy set, associated with the snapshot (or, file system), and adds the selected policy to the new saved policy set.

At 416 the policy checker can add the selected policy to the saved policy set, and/or at 418, create a new saved policy set and add the selected policy to it, based on an indication or criteria. For example, a request to a policy checker can include a parameter, such as a flag, associated with each policy in the request, and each flag that can indicate to store, or not to store, the corresponding policy, and/or store output results of applying that policy, for subsequent requests that include that policy. In another example, a policy checker can have, or can refer to, a "setting" (e.g., a programming variable) that specifies for a particular policy or, alternatively, for a set of policies collectively, whether or not to store the corresponding policy, or according to which particular criteria to store the corresponding policy. The setting can be provided with a request or, alternatively, can be provided independent of any particular request (such as set by a user or administrator of a computing system that includes or is associated with the policy checker).

At 420, the policy checker determines if there are additional policies included in the request to apply to the snapshot. If so, the policy checker repeats 404 through 420. If not, at 422 the policy checker determines if a saved policy set is stored, or otherwise recorded, in association with the snapshot (or, the file system). The saved policy set determined at 422 can be a saved policy set determined at 414, a new saved policy set created at 418, or a different saved policy set associated with the snapshot (or, the file system). The saved policy set can be associated with a particular set of file components in a file system (e.g., the snapshot), and can be a result of a previous request to check an input set of data elements for conformance to one or more policies.

For example, with reference to the example of FIG. 3, policy set 310 can be created, and/or modified, in response to a previous request to apply one or more particular policies (e.g., policies A, B, and/or C) to snapshot 312. In another example, a saved policy set can be a set of policies pre-determined—such as by another program, a user, or a computing or file system administrator—and saved for a policy checker to apply in subsequent requests. For example, with reference again to the example of FIG. 3, policy set 310 can be predetermined to include policies A, B, and C.

If, at 422, the policy checker determines that there is a saved policy set, at 424 the policy checker selects a policy included in the saved policy set. If the saved policy set is a new saved policy set created (or, modified) at 418, the policy checker may determine that there are no policies included in the saved policy set that have not yet been applied and may, at 432, complete checking the snapshot. On the other hand, the saved policy set can be a policy set saved from previous applications of particular policies to the same, or a different, snapshot (more broadly, to the same or a different input set of data elements). For example, the saved policy set can be a pre-determined set or, alternatively, a set generated from previous applications of policies to the snapshot (or, a version of the snapshot).

Additionally, in some embodiments, a saved policy set created at 418 can be modified by other programs, or components, of a computing system (e.g., by another instance, or invocation, of a policy checker performing method 400 concurrently). At 424 the policy checker can select, for example, a policy in that saved policy set that has not yet, in performing method 400, been applied to the snapshot.

At 426, the policy checker optionally applies the policy selected at 424 to the snapshot and, at 428 the policy checker saves the new policy output information. An embodiment can include criteria to determine that a saved policy should be deleted from a saved policy set, in addition to, or in lieu of, applying the policy to the input set of data elements. Accordingly, at 426 the policy checker can, according to the criteria, optionally apply the policy to the snapshot and can optionally (also according to the criteria) delete the policy from the saved policy set.

In embodiments, at 408 and/or 426, in applying a policy to the snapshot a policy checker can exhaustively check every file component included in the snapshot. However, it would be apparent to one of ordinary skill in the art that it is not necessary to apply one or more requested policies exhaustively to all file components included in a snapshot (or, all file components in a particular set of file components), and that a policy checker can determine if there are more file components to check in a snapshot based on various criteria. For example, a policy checker can limit the number of file components to a particular number (e.g., the first particular number of file components selected in the snapshot) less than all file components in the file system.

A policy checker can limit the number of file components to check based, in another example, on a particular attribute of the file components, such as: a selected alphabetic range of file component names; a particular location in which the file component is, or has been, stored; or, a particular location in which a set of file components conforming to one or more policies is to be stored, based, for example, on those file components conforming to the policy or policies. In yet another example, a policy checker could determine a subset of file components in the snapshot to check against one subset of requested policies and determine a different subset of file components in the snapshot to check against another subset of requested policies.

In embodiments, a criteria used at 426 to apply or delete a policy can include, for example, a setting (or, for example, a value included with a request) to indicate that a particular policy (or a particular set of policies) is to remain in a saved policy set until a particular number of consecutive requests associated with a set of data elements (e.g., the snapshot or file system) have been received that do not specify that particular policy (or subset). For example, using the context of FIG. 3, a setting can specify that policy A be included in policy set 310 until 2 consecutive requests are received for the snapshot (e.g., at 402) that do not include policy A. If a policy checker subsequently receives 2 consecutive requests that do not include policy A, based on the setting, at 426 the policy checker can remove policy A from policy set 310, and (optionally, and possibly based on the criteria or setting) remove any saved policy output information associated with prior application of policy A.

In another example, criteria can indicate a period of time, or a particular time, for which a particular policy, or subset of policies, in the saved policy set should remain stored, and the policy, or policies, should be removed from the saved policy set after that period expires or particular time occurs. It would be apparent to one of ordinary skill in the art that a criterion to determine when to remove a policy from a saved policy set can be associated with a variety of conditions beyond these examples.

In determining to remove the selected policy from the saved policy set, the policy checker can optionally omit applying the policy and saving new policy output information at 428. Alternatively, the policy checker can apply the policy prior to removing it, and, at 428, save the new policy output information. At 430, the policy checker determines if there are additional policies remaining in the saved policy set determined at 422 to process. If so, the policy checker repeats 424 through 430. If not, the policy checker at 432 completes checking the snapshot.

At 410 and/or 428, the policy checker can save the new policy output information, in association with the snapshot (or, the file system) and/or the policy selected, respectively at 404 and 424, to return to the requester in response to subsequent requests to check the snapshot for that same selected policy. For example, as illustrated in the example of FIG. 3, the policy checker can return saved policy output information in response to a subsequent request to apply a saved policy to the snapshot, instead of evaluating (as in 408 and/or 426) the snapshot again for that same policy.

In some embodiments one program can request to check a set of data elements (e.g., a file system) at a particular time and another program can request to check that set of data elements at a subsequent time. The set of data elements can differ over time such that at the time of the subsequent check, the set of data elements can differ from the set of data elements at the time of the prior policy check. A policy checker (or, a policy checking function of a computing system) can improve efficiency of checking the subsequent set of data elements if the results of the first check have been saved.

Figure 5:
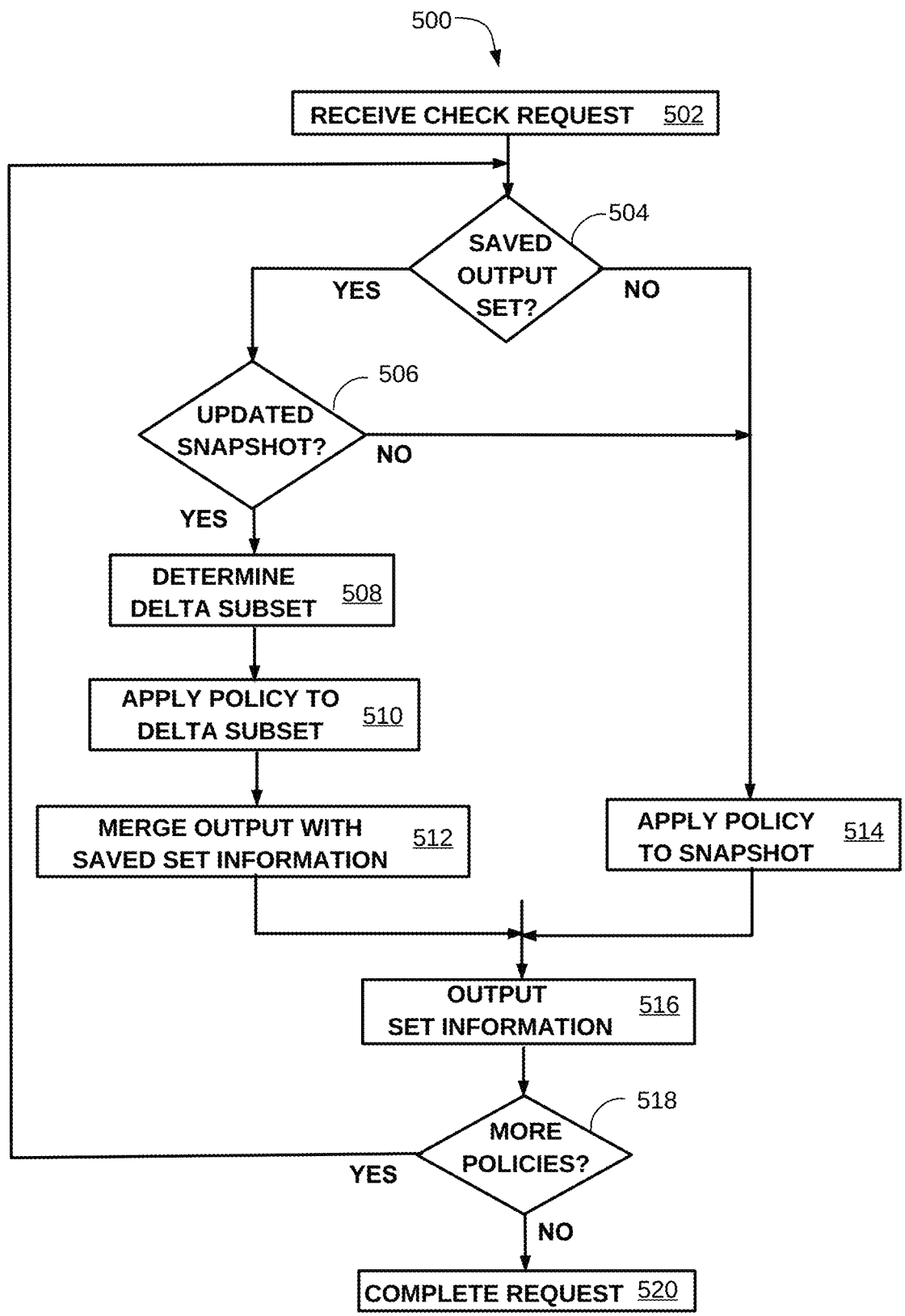
FIG. 5 is a flowchart that illustrates an example method to identify a set of conforming data elements from a delta input set, according to aspects of the disclosure.

FIG. 5 illustrates an example method, 500, to utilize results of applying a particular policy to a particular set of data elements, from a policy check performed at a prior time, in response to a subsequent request to apply a same policy to that same set of data elements. For purposes of illustrating the method, but not intended to limit embodiments, the method is described as performed by a policy checker using a snapshot of a file system as an example set of data elements, such as previously described.

At 502 of method 500, the policy checker receives a request to apply one or more policies to a snapshot of a file system. At 504 the policy checker determines if policy output information has been saved from previously applying the requested policy to the prior snapshot. If not, at 514 the policy checker applies the requested policy to the snapshot included in the request. The policy checker can use methods such as previously described in reference to FIGS. 2, 3, and/or 4, for example, to apply the requested policy.

If, at 504, the policy checker determines that there is saved policy output information, at 506 the policy checker determines if the snapshot is a modified version of a previous snapshot, such as, for example, an updated (e.g., subsequent) snapshot of a file system for which a prior snapshot was checked for the requested policy. For example, one program may have previously requested the policy checker to apply a particular policy "A" to a first snapshot of the file system (e.g., a first list of file components included in the file system) taken at a prior time. Another program may subsequently request the policy checker to apply policy A to an updated snapshot of the file system taken at a later time.

The policy checker can determine, at 506, that the requested snapshot is an updated snapshot based, for example, on the existence of policy output information generated and saved in previously applying the requested policy to the prior snapshot. If, at 506, the policy checker determines that the requested snapshot is not an updated snapshot of a snapshot previously checked for the requested policy, at 514 the policy checker applies the requested policy to the snapshot included in the request.

If, on the other hand, at 506 the policy checker determines that the requested snapshot is a modified version of a prior snapshot and policy output information associated with the requested policy, and/or the previous snapshot, exists (e.g., saved policy output information such as resulting from the example methods of FIG. 3 and FIG. 4), at 508 the policy checker generates a delta subset of the snapshot that includes file components in the requested (i.e., updated) snapshot that are not included in the prior snapshot. At 510 the policy checker applies the requested policy to the delta subset to generate new policy output information associated with file components in the delta subset that conform to the requested policy. As previously described, the policy checker can use methods described in reference to FIGS. 2, 3, and/or 4 to apply the policy.

At 512 the policy checker merges the new policy output information determined at 510 with the policy output information saved from applying the requested policy to the prior snapshot. At 516 the policy checker outputs (and, optionally, returns to the requester) the merged policy output information generated at 512 or, alternatively, the new policy output information generated at 514. At 512 and/or 514, the policy checker can store the respective merged and/or new policy output information, and the respective merged and/or new policy output information can be stored in addition to, or in place of, the policy output information saved from the prior application of the policy to the first snapshot. The policy checker can save the merged and/or new policy output information in association with the requested policy and/or the prior or the new (modified) snapshot. At 518 the policy checker determines if the request includes additional policies to apply and, if so, repeats 504 through 518. At 520, the policy checker completes processing the request (e.g., the policy checker can return the output information from 516 to the requester).

In some embodiments, two or more policies can share common policy attributes. For example, two policies can each include a rule that a file component must be a CSV type (an example policy attribute), or that a modification date of a file component must be on or after a particular date (another example policy attribute), to conform to the policy. A policy checker can improve the efficiency of applying policies to a requested set of data elements by combining checks for policy attributes that are common to two or more policies.

Figure 6A:
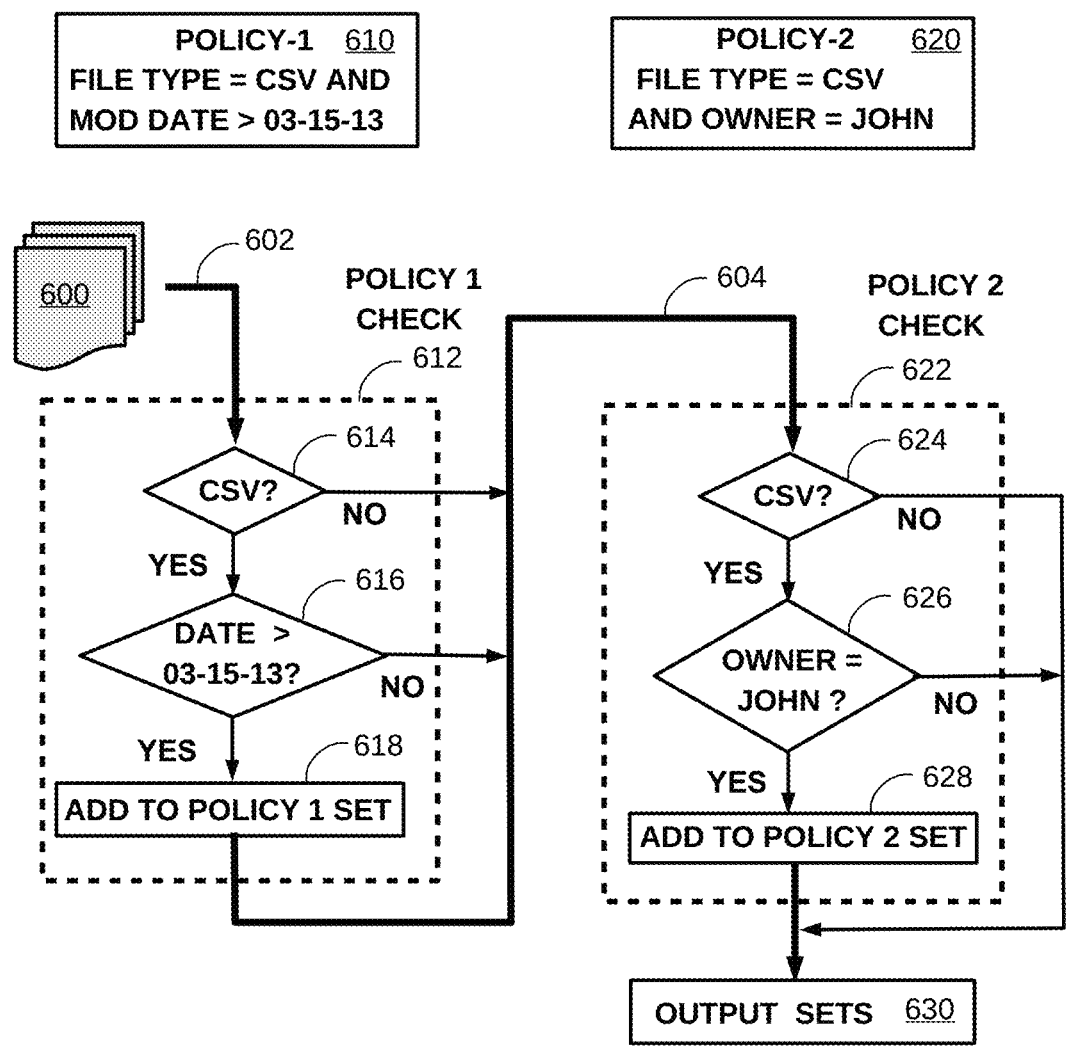
FIG. 6A is a flowchart that illustrates an example of serially applying a plurality of policies to an input set of data elements, according to aspects of the disclosure.

FIG. 6A illustrates an example of a policy checker applying two policies to a file component, in which the policy checker applies the policies sequentially to the file component, and the two policies have an attribute in common. In response to a request to apply policies 610 and 620 to file component set 600, the policy checker applies 602 policy 610 to a file component included in file component set 600. Policy check 612 includes determining at 614 if the file component type is "CSV", determining at 616 if the modification date is after Mar. 15, 2013, and adding at 618 a conforming file component to a set of file components conforming to policy 1. Subsequently, the policy checker applies 604 policy 622 to the file component, which includes determining at 624 if the file component type is "CSV", determining at 626 if the file component owner is "JOHN", and adding at 628 a conforming file component to a set of file components conforming to policy 2. The policy checker outputs 630 the resulting sets of conforming file components (e.g., returns the conforming file component sets to the requester).

Example policies 610 and 620 each have a policy rule in common: "file type=CSV". In the example of FIG. 6A, the policy checker applies the test for "file type=CSV" twice to each file component included file component set 600, once in policy check 612 and a second time in policy check 622. Accordingly, it can be more efficient in a policy checker to combine tests for a common attribute of a data element into a single check. In embodiments in which the set of input data elements to check is very large, such as the possible billions of file components in a large file system, combining policy checks can have significant improvements in efficiency and performance of checking the data elements for conformance to policies.

Figure 6B:
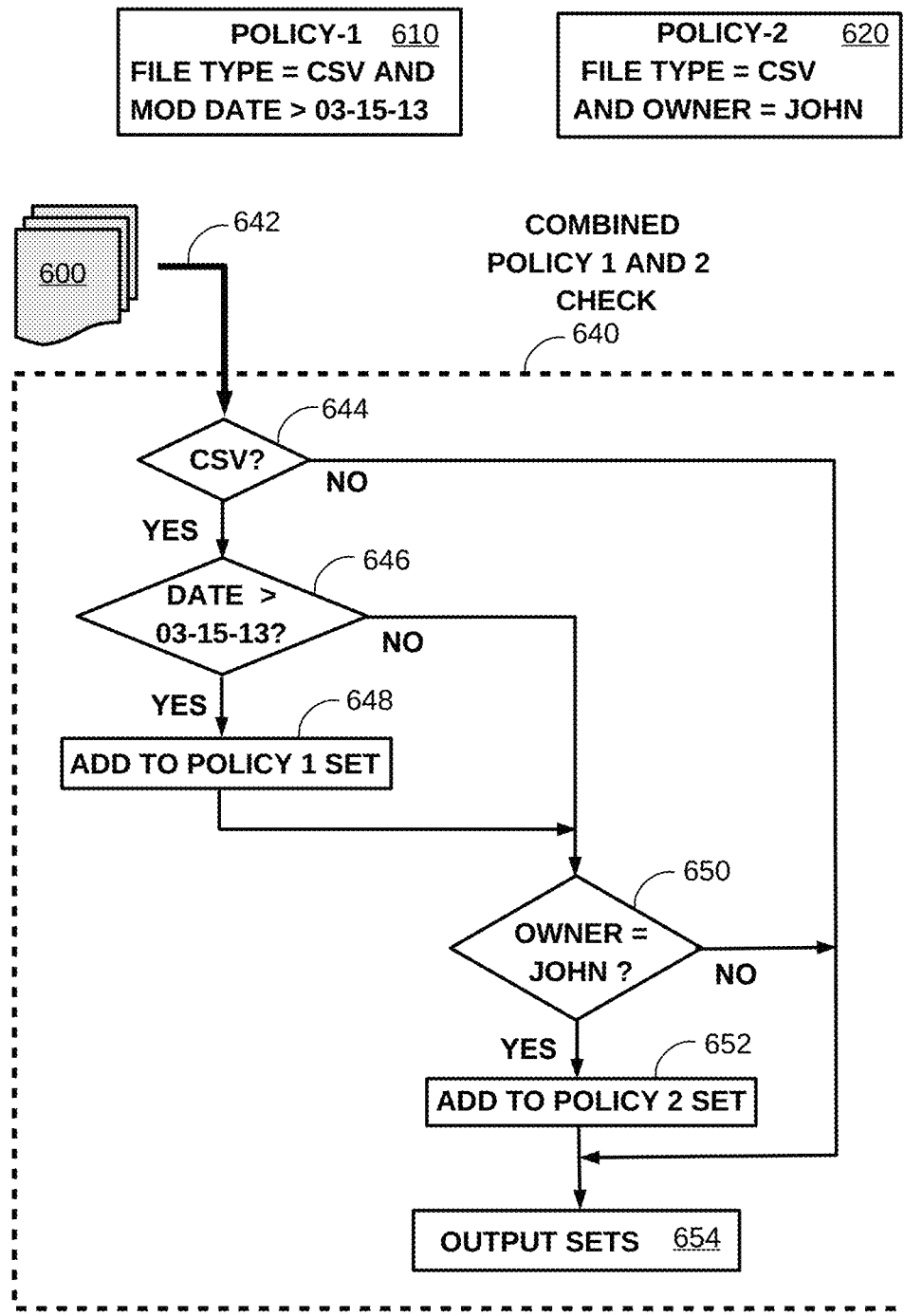
FIG. 6B is a flowchart that illustrates an example method to apply a plurality of policies to a data element by combining a common policy attribute, according to aspects of the disclosure.

FIG. 6B illustrates an example, using the context of the example of FIG. 6A, of combining policy checks. The policy checker applies 642 both policies 610 and 620, using a combined policy 1 and policy 2 check 640, to a file component included in file component set 600 from the example of FIG. 6A. Policy check 640 includes testing at 644 a file component for "file type=CSV", testing at 646 a file component matching the CSV file type for "modification date>3=03-15-13", and adding at 648 a file component that has both policy attributes to a set of file components conforming to policy 1. Policy check 640 further includes testing at 650 a file component matching the CSV file type (including file components that also conform to policy 1) for "owner=JOHN", and adding at 652 a file component that has both policy attributes to a set of file components conforming to policy 2.

Selecting file components to include in, or exclude from, a backup copy of file components in a file system are examples of applying policies to determine data elements within a set of data elements conforming to one or more policies. However, it would be apparent to one of ordinary skill in the art that the methods of the disclosure can apply to a variety of types of elements in a variety of differing types of sets of elements, such as the database system previously described.

Figure 7:
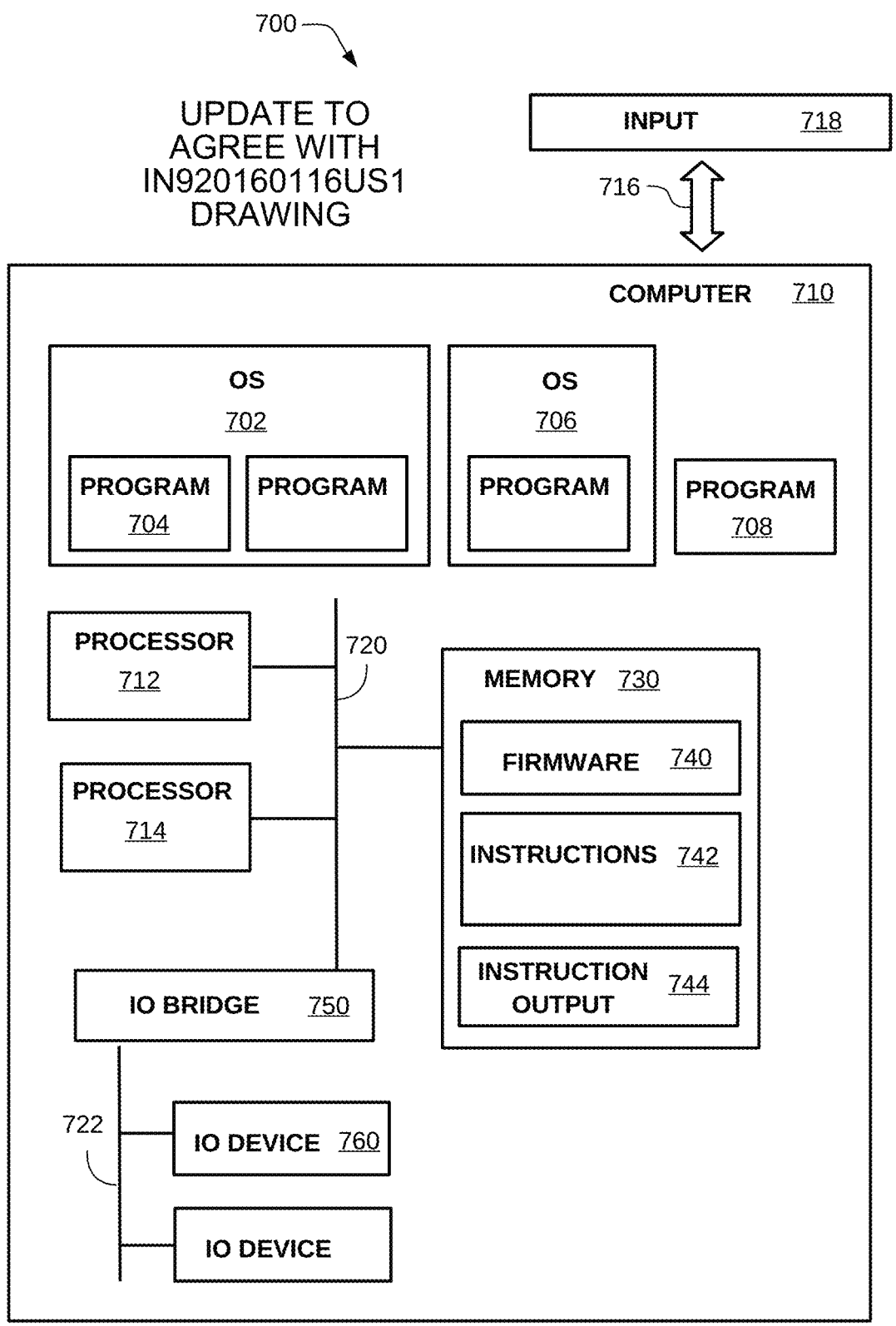
FIG. 7 is a block diagram illustrating an example computer that can embody methods and structures of the disclosure.

Embodiments of the disclosure can be, or can include a computer system, such as illustrated in the example of FIG. 7. As shown in FIG. 7, computer system 700 includes computer 710 having processors 712 and 714. In embodiments processors can be a single processor or a multi-threaded processor, a general purpose or a special purpose processor, a co-processor, or any of a variety of processing devices that can execute computing instructions.

Computer system 700 is configured with interface 716 coupling computer 710 to input source 718. Input source 718 can be, for example, a program that can request a policy checker to apply a policy to a set of data elements, such as illustrated in programs 300 of FIG. 3, and input source 718 can provide a set of data elements (e.g., a snapshot of a file system) to computer 710, or otherwise enable computer 710 to access a set of data elements, using interface 716. In embodiments, interface 716 can enable computer 710 to receive, or otherwise access input data via, for example, a network (e.g., an intranet, or a public network such as the Internet), or a storage medium, such as a disk drive internal or connected to computer 710. For example, interface 716 can be a command or function call of, or to, a policy checker included in computer 710.

Interface 716 can be configured to enable human input, or to couple computer 710 to other input devices, such as described later in regard to components of computer 710. Interface 716 can enable, for example, a human user or a system administrator to request a policy checker to apply one or more policies to a set of data elements. It would be apparent to one of ordinary skill in the art that the interface can be any of a variety of interface types or mechanisms suitable for a computer, or a program operating in a computer, to receive or otherwise access or receive an input set of data elements.

Processors included in computer 710 are connected by a memory interface 720 to memory 730. In embodiments a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

In embodiments, a computer can include a plurality of memories. A memory interface, such as 720, between a processor (or, processors) and a memory (or, memories) can be, for example, a memory bus common to one or more processors and one or more memories. In some embodiments, a memory interface, such as 720, between a processor and a memory can be point to point connection between the processor and the memory, and each processor in the computer can have a point-to-point connection to each of one or more of the memories. In other embodiments, a processor (for example, 712) can be connected to a memory (e.g., memory 730) by means of a connection (not shown) to another processor (e.g., 714) connected to the memory (e.g., 720 from processor 714 to memory 730).

A computer can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, computer 710 includes IO bridge 750 interfacing memory interface 720 to IO devices, such as IO device 760. In some embodiments, an IO bridge can connect directly to a processor or a memory, or can be a component included in a processor or a memory. An IO bridge can be, for example, a PCI-Express or other IO bus bridge, or can be an IO adapter.

An IO bridge can connect to IO devices by means of an IO interface, or IO bus, such as IO bus 722 of computer 710. For example, IO bus 722 can be a PCI-Express or other IO bus. IO devices can be any of a variety of peripheral IO devices or IO adapters connecting to peripheral IO devices. For example, IO device 760 can be a graphic card, keyboard or other input device, a hard drive or other storage device, a network interface cards, etc. IO device 760 can be an IO adapter, such as a PCI-Express adapter, that connects components (e.g., processors or memories) of a computer to IO devices (e.g., disk drives, Ethernet networks, video displays, keyboards, mice, etc.).

A computer can include instructions executable by one or more of the processors (or, processing elements, such as threads of a processor). The instructions can be a component of one or more programs. The programs, or the instructions, can be stored in, and/or utilize, one or more memories of a computer. As illustrated in the example of FIG. 7, computer 710 includes a plurality of programs, such as program 708 and program 704. A program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure.

A program can be a program that embodies the methods, or portions thereof, of the disclosure. For example, a program can be a program that executes on a processor of computer 710 to perform the example methods of the disclosure, or portions thereof. A program can be a policy checker, or a function or component thereof.

Programs can be "stand-alone" programs that execute on processors and use memory within the computer directly, without requiring another program to control their execution or their use of resources of the computer. For example, computer 710 includes stand-alone program 708. A stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, computer 710 includes operating systems (OSes) 702 and 706, each of which can include, or manage execution of, one or more programs, such as OS 702 including (or, managing) program 704. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 710 includes firmware 740 stored in memory 730. In other embodiments, firmware can be embodied as instructions (e.g., comprising a computer program product) on a storage medium (e.g., a CD ROM, a flash memory, or a disk drive), and the computer can access the instructions from the storage medium.

In embodiments of the present disclosure, a computer can include instructions to perform the example methods of the disclosure, or portions thereof. Computer 710 includes, for example, program 704, and program 704 can include instructions 742, which can operate to apply one or more policies to a set of input data elements, and can store the set of file components conforming to a policy in instruction output 744, as described herein. The computer can store the instructions and/or the instruction output in a memory of the computer, such as computer 710 storing program instructions 742 and instruction output 744 in memory 730.

The example computer system 700 and computer 710 are not intended to limiting to embodiments. In embodiments, computer system 700 can include a plurality of processors, interfaces, and <inputs> and can include other elements or components, such as networks, network routers or gateways, storage systems, server computers, virtual computers or virtual computing and/or TO devices, cloud-computing environments, and so forth. It would be evident to one of ordinary skill in the art to include a variety of computing devices interconnected in a variety of manners in a computer system embodying aspects and features of the disclosure.

In embodiments, computer 710 can be, for example, a computing device having a processor capable of executing computing instructions and, optionally, a memory in communication with the processor. For example, computer 710 can be a desktop or laptop computer; a tablet computer, mobile computing device, or cellular phone; or, a server computer, a high-performance computer, or a super computer. Computer 710 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for identifying a set of files, conforming to a policy, the method comprising:
receiving, by at least one processor, a first request to determine files, included in a first snapshot of a file system that conform to a first policy attribute, wherein the first policy attribute is included in an input policy, wherein the first request includes a request to determine files included in the first snapshot of the file system that conform to a second policy attribute, and wherein the second policy attribute is included in the input policy;
determining, by the at least one processor, in response to the first request, that policy output information for the first policy attribute is not saved in a storage device;
identifying, by the at least one processor, in response to determining that policy output information for the first policy attribute is not saved in the storage device, a first subset of files, included in the first snapshot of the file system, that conform to the first policy attribute;
identifying, by the at least one processor, in response to the first request a third subset of files, included in the first snapshot of the file system, that conform to the second policy attribute, wherein the first subset of files conform to the first policy attribute based on respective file type attributes of files in the first subset of files matching a first file type, and wherein the third subset of files conform to the second policy attribute based on respective modification date attributes of the third subset of files being greater than a first date;
saving, by the at least one processor, first policy output information descriptive of the first subset of files, and third policy output information comprising information descriptive of files included in the third subset of files;
receiving, by the at least one processor, a subsequent request to determine files, included in a subsequent snapshot of the file system, that conform to the first policy attribute;
determining, by the at least one processor, based on the first policy output information, a difference set comprising files included in the subsequent snapshot that are not included in the first snapshot;
identifying, by the at least one processor, a second subset of files, included in the difference set, that conform to the first policy attribute;
generating second policy output information descriptive of files included in the second subset of files; and
outputting, by the at least one processor, the first policy output information merged with the second policy output information.

2. The method of claim 1, wherein the method further comprises including, by the at least one processor, the first policy attribute in a saved policy set.

3. The method of claim 2, wherein the at least one processor including the first policy attribute in the saved policy set is based on the first policy attribute not included in the saved policy set and a setting, wherein the setting denotes to include the first policy attribute in the saved policy set.

4. The method of claim 1, wherein the method further comprises:
identifying a common policy attribute, wherein the common policy attribute is a policy attribute included in each of a first policy and a second policy, and wherein the first and the second policy are included in the input policy;
combining a check for the common policy attribute included in the first policy with a check for the common policy attribute included in the second policy, wherein the combining reduces the computation required for the at least one processor to determine a fourth subset of files, included in the first snapshot of the file system, that conform to the first policy and the second policy.

5. The method of claim 1, wherein each of the files included in the first subset of files and the second subset of files comprises a file component included in the file system.

6. A computer program product for identifying a set of files conforming to a policy, the computer program product comprising a computer readable storage medium having program instructions embodied therewith, the program instructions executable by an at least one processor to cause the at least one processor to:
receive a first request to determine files, included in a first snapshot of a file system that conform to a first policy attribute, wherein the first policy attribute is included in an input policy wherein the first request includes a request to determine files included in the first snapshot of the file system that conform to a second policy attribute, and wherein the second policy attribute is included in the input policy;
determine, in response to the first request, that policy output information for the first policy attribute is not saved in a storage device;
identify, in response to determining that policy output information for the first policy attribute is not saved in the storage device, a first subset of files, included in the first snapshot of the file system, that conform to the first policy attribute;
identify, by the at least one processor, in response to the first request a third subset of files, included in the first snapshot of the file system, that conform to the second policy attribute, wherein the first subset of files conform to the first policy attribute based on respective file type attributes of files in the first subset of files matching a first file type, and wherein the third subset of files conform to the second policy attribute based on respective modification date attributes of the third subset of files being greater than a first date;
save first policy output information descriptive of the first subset of files, and third policy output information comprising information descriptive of files included in the third subset of files;
receive a subsequent request to determine files, included in a subsequent snapshot of the file system, that conform to the first policy attribute;
determine, based on the first policy output information, a difference set comprising files included in the subsequent snapshot that are not included in the first snapshot;
identify a second subset of files, included in the difference set, that conform to the first policy attribute;
generate second policy output information descriptive of files included in the second subset of files; and
output, the first policy output information merged with the second policy output information.

7. The computer program product of claim 6, wherein the program instructions further cause the at least one processor to include the first policy attribute in a saved policy set.

8. The computer program product of claim 7, wherein the program instructions cause the at least one processor to include the first policy attribute in the saved policy set based on the first policy attribute not included in the saved policy set and an indication, wherein the indication denotes to include the first policy attribute in the saved policy set.

9. The computer program product of claim 6, wherein the program instructions cause the at least one processor to:
identify a common policy attribute, wherein the common policy attribute is a policy attribute included in each of a first policy and a second policy, and wherein the first and the second policy are included in the input policy;
combine a check for the common policy attribute included in the first policy with a check for the common policy attribute included in the second policy, wherein the combining reduces the computation required for the at least one processor to determine a fourth subset of files, included in the first snapshot of the file system, that conform to the first policy and the second policy.

10. The computer program product of claim 6, wherein each of the files included in the first subset of files and the second subset of files comprises a file component included in the file system.

11. A computing system for identifying a set of files conforming to a policy, the computing system comprising:
a memory configured to store policy output information; and
at least one processor coupled to the memory, wherein the at least one processor is configured to:
receive a first request to determine files, included in a first snapshot of a file system that conform to a first policy attribute, wherein the first policy attribute is included in an input policy, wherein the first request includes a request to determine files included in the first snapshot of the file system that conform to a second policy attribute, and wherein the second policy attribute is included in the input policy;
determine, in response to the first request, that policy output information for the first policy attribute is not saved in a storage device;
identify, in response to determining that policy output information for the first policy attribute is not saved in the storage device, a first subset of files, included in the first snapshot of the file system, that conform to the first policy attribute;
identify, by the at least one processor, in response to the first request a third subset of files, included in the first snapshot of the file system, that conform to the second policy attribute, wherein the first subset of files conform to the first policy attribute based on respective file type attributes of files in the first subset of files matching a first file type, and wherein the third subset of files conform to the second policy attribute based on respective modification date attributes of the third subset of files being greater than a first date;
save first policy output information descriptive of the first subset of files, and third policy output information comprising information descriptive of files included in the third subset of files;
receive a subsequent request to determine files, included in a subsequent snapshot of the file system, that conform to the first policy attribute;
determine, based on the first policy output information, a difference set comprising files included in the subsequent snapshot that are not included in the first snapshot;
identify a second subset of files, included in the difference set, that conform to the first policy attribute;
generate second policy output information descriptive of files included in the second subset of files; and
output, the first policy output information merged with the second policy output information.

12. The system of claim 11, wherein a first and a second policy are included in the input policy, and wherein the at least one processor is further configured to:
identify a common policy attribute, wherein the common policy attribute is a policy attribute included in each of a first policy and a second policy, and wherein the first and the second policy are included in the input policy;
combine a check for the common policy attribute included in the first policy with a check for the common policy attribute included in the second policy, wherein the combining reduces the computation required for the at least one processor to determine a fourth subset of files, included in the first snapshot of the file system, that conform to the first policy and the second policy.

13. The system of claim 11, wherein the at least one processor is further configured to include the first policy attribute in the saved policy set based on the first policy attribute not included in the saved policy set and an indication, wherein the indication denotes to include the first policy attribute in the saved policy set.

14. The system of claim 11, wherein each of the files included in the first subset of files and the second subset of files comprises a file component included in the file system.

\* \* \* \* \*